United States Patent
Huang

(10) Patent No.: US 7,293,934 B1
(45) Date of Patent: Nov. 13, 2007

(54) TELESCOPICALLY ADJUSTABLE PIPE

(75) Inventor: Yao-Chung Huang, Changhua Hsien (TW)

(73) Assignee: Ho Cheng Garden Tools Co., Ltd., Changhua Hsien (TW)

( * ) Notice: Subject to any disclaimer, the term of this patent is extended or adjusted under 35 U.S.C. 154(b) by 339 days.

(21) Appl. No.: 11/080,243

(22) Filed: Mar. 15, 2005

(51) Int. Cl.
*F16B 7/10* (2006.01)
*F16B 21/00* (2006.01)

(52) U.S. Cl. .............................. 403/109.1; 403/109.2; 403/109.3; 403/379.5; 403/322.4; 403/325

(58) Field of Classification Search .. 403/109.1–109.3, 403/109.7, 379.5, 322.4, 325; 292/137, 163, 292/169, 302, DIG. 37, DIG. 63
See application file for complete search history.

(56) References Cited

U.S. PATENT DOCUMENTS

| | | | | |
|---|---|---|---|---|
| 2,547,108 A | * | 4/1951 | Anderson | 292/170 |
| 4,079,965 A | * | 3/1978 | Moughty et al. | 285/7 |
| 5,462,311 A | * | 10/1995 | Cipolla | 285/7 |
| 5,845,664 A | * | 12/1998 | Ryder et al. | 135/65 |
| 5,909,760 A | * | 6/1999 | Tsai | 16/429 |
| 5,931,065 A | * | 8/1999 | Jackson et al. | 81/177.2 |
| 5,975,592 A | * | 11/1999 | Lin | 292/37 |
| 6,435,754 B1 | * | 8/2002 | Canale | 403/109.2 |
| 7,025,383 B2 | * | 4/2006 | Canale | 285/7 |
| 7,186,048 B2 | * | 3/2007 | Robins | 403/109.3 |
| 2004/0051302 A1 | * | 3/2004 | Canale | 285/7 |

* cited by examiner

*Primary Examiner*—Daniel P. Stodola
*Assistant Examiner*—Joshua T Kennedy
(74) *Attorney, Agent, or Firm*—Alan Kamrath; Kamrath & Associates, P.A.

(57) ABSTRACT

A telescopically adjustable pipe includes an outer tube, an inner tube, an inner bushing, a sleeve, a push member, a mounting bracket, a positioning member, and a retaining member. Thus, the positioning member is moved by movement of the push member and is detachably locked in the respective positioning hole of the inner tube to lock the inner tube in the outer tube, so that the inner tube is locked in and cannot slip from the outer tube.

17 Claims, 4 Drawing Sheets

TELESCOPICALLY ADJUSTABLE PIPE

BACKGROUND OF THE INVENTION

1. Field of the Invention

The present invention relates to a telescopically adjustable pipe, and more particularly to a telescopically adjustable pipe for a gardening tool, such as a pair of long-arm pruning shears or the like.

2. Description of the Related Art

A conventional telescopically adjustable pipe for a gardening tool, such as a pair of long-arm pruning shears or the like, comprises an outer tube and an inner tube retractably mounted in the outer tube. However, the inner tube is clamped in the outer tube by friction between the inner tube is fitted in the outer tube, so that the inner tube is not positioned in the outer tube closely and easily slips from the outer, thereby causing inconvenience to a user in operation of the conventional telescopically adjustable pipe.

SUMMARY OF THE INVENTION

In accordance with the present invention, there is provided a telescopically adjustable pipe, comprising an outer tube; an inner tube movably mounted in the outer tube and having an end portion formed with a plurality of positioning holes; a sleeve mounted on an end portion of the outer tube and having an outer wall formed with a locking seat; a push member movably mounted on the locking seat of the sleeve and having a first end formed with a receiving chamber having two opposite sides each formed with an oblique adjusting slot; a positioning member movably mounted in the receiving chamber of the push member and having a first end extended through the sleeve and the outer tube and detachably locked in either one of the positioning holes of the inner tube to lock the inner tube in the outer tube; a control member mounted on the positioning member to move the positioning member and having two ends each slidably mounted in the respective oblique adjusting slot of the push member.

The primary objective of the present invention is to provide a telescopically adjustable pipe whose length can be adjusted easily and rapidly.

Another objective of the present invention is to provide a telescopically adjustable pipe, wherein the positioning member is locked in the respective positioning hole of the inner tube to lock the inner tube in the outer tube, so that the inner tube is locked in and cannot slip from the outer tube.

A further objective of the present invention is to provide a telescopically adjustable pipe, wherein the press portion of the retaining member is pressed on the positioning member to stop movement the positioning member, thereby locking the positioning member, so that the inner tube is locked in the outer tube rigidly and stably.

A further objective of the present invention is to provide a telescopically adjustable pipe, wherein the push member and the positioning member are pushed to return to the original position by the restoring force of the elastic member and the elastic member respectively, so that the positioning member is locked in the respective positioning hole of the inner tube so as to lock the inner tube in the outer tube automatically, thereby facilitating a user adjusting the length of the telescopically adjustable pipe.

Further benefits and advantages of the present invention will become apparent after a careful reading of the detailed description with appropriate reference to the accompanying drawings.

DETAILED DESCRIPTION OF THE INVENTION

Figure 1:
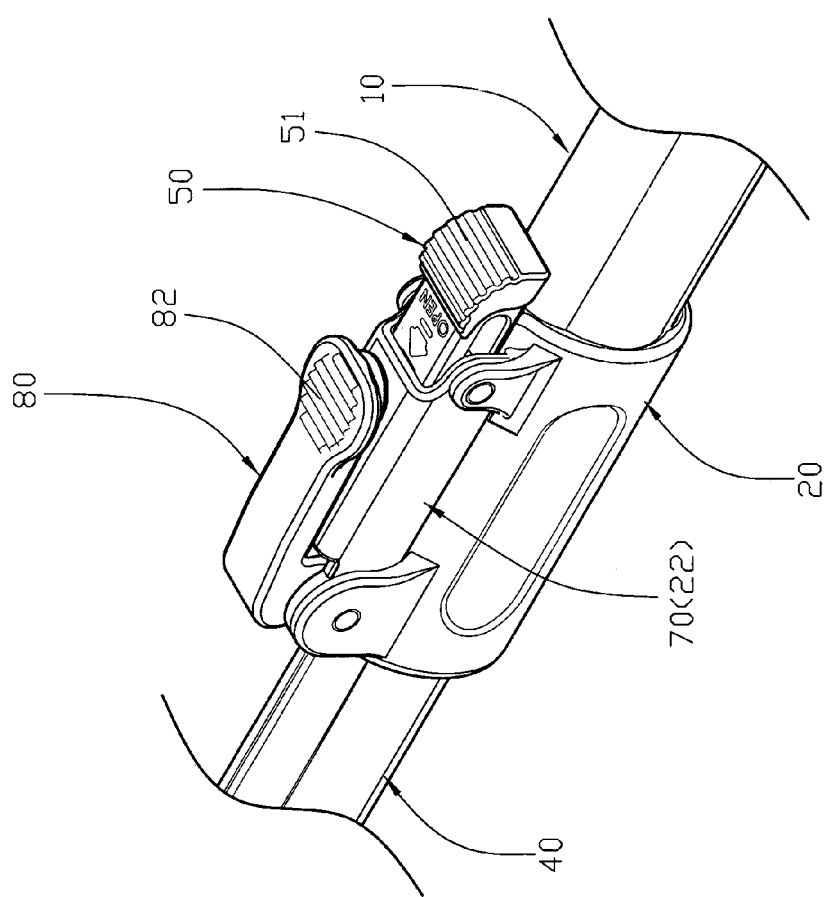
FIG. 1 is a partially cut-away perspective view of a telescopically adjustable pipe in accordance with the preferred embodiment of the present invention.
Figure 2:
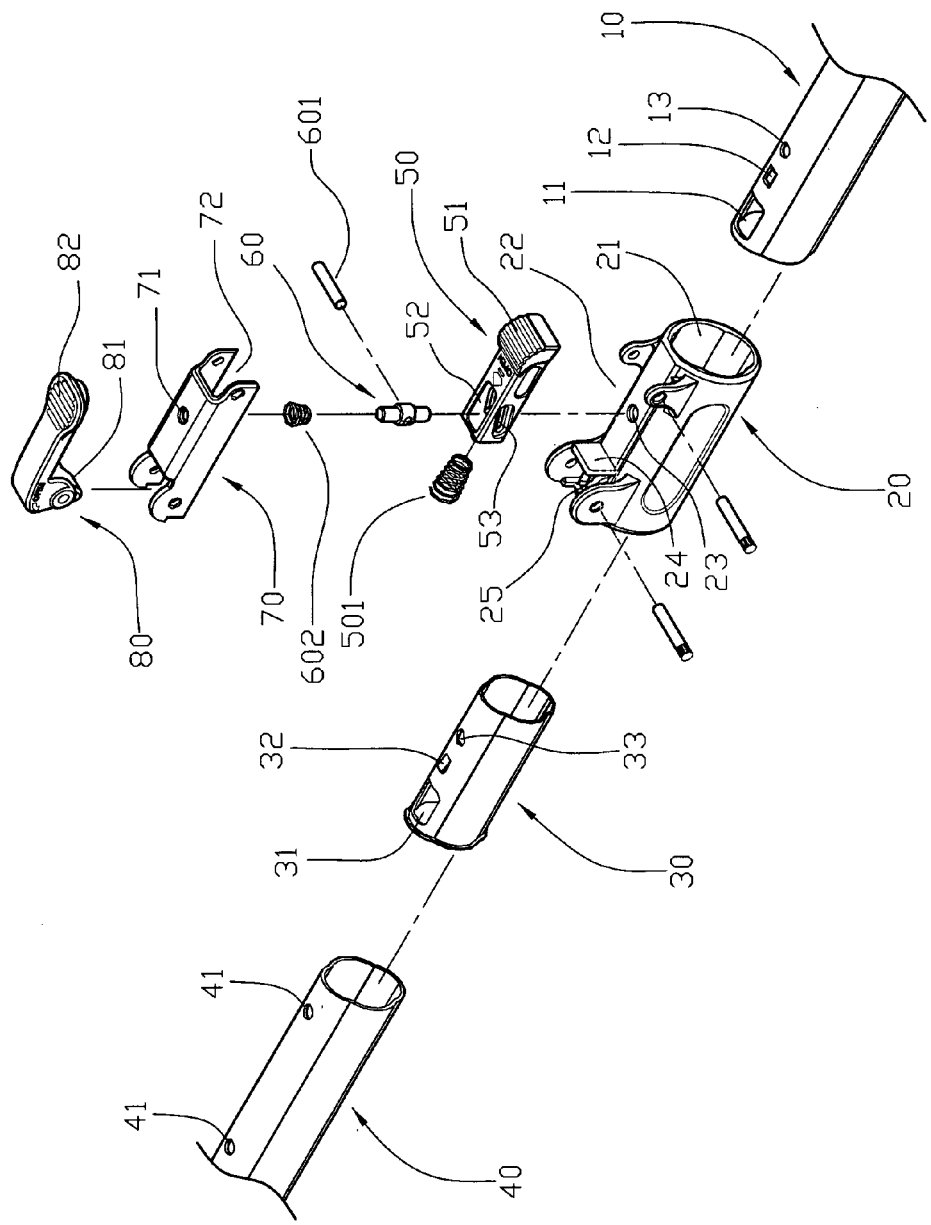
FIG. 2 is an exploded perspective view of the telescopically adjustable pipe as shown in FIG. 1.
Figure 3:
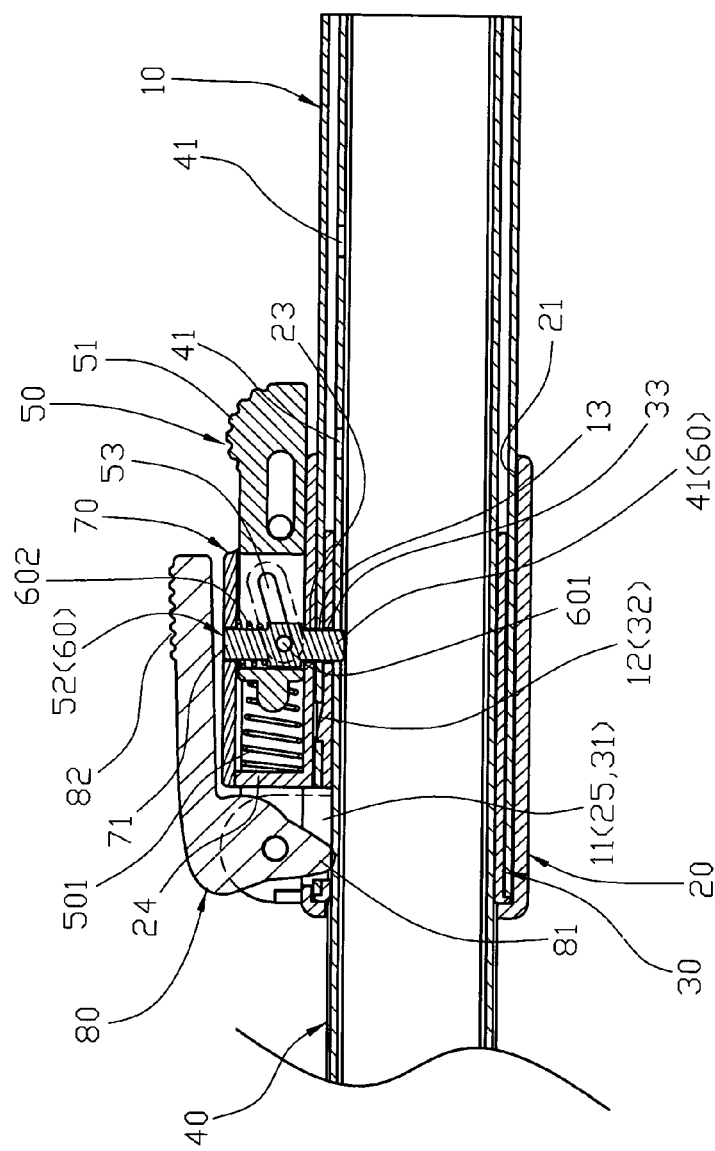
FIG. 3 is a plan cross-sectional view of the telescopically adjustable pipe as shown in FIG. 1.

Referring to the drawings and initially to FIGS. 1-3, a telescopically adjustable pipe in accordance with the preferred embodiment of the present invention comprises an outer tube 10, an inner tube 40, an inner bushing 30, a sleeve 20, a push member 50, a mounting bracket 70, a positioning member 60, and a retaining member 80.

The outer tube 10 has an end portion formed with a through hole 13, a locking hole 12 and an opening 11.

The inner tube 40 is movably mounted in the outer tube 10 and has an end portion formed with a plurality of positioning holes 41.

The inner bushing 30 is mounted between the end portion of the outer tube 10 and the end portion of the inner tube 40 and has a peripheral wall formed with a through hole 33 aligning with the through hole 13 of the outer tube 10, a wedge-shaped locking block 32 locked in the locking hole 12 of the outer tube 10 and an opening 31 aligning with the opening 11 of the outer tube 10.

The sleeve 20 is mounted on the end portion of the outer tube 10 and has an inner wall formed with a fitting hole 21 fitted onto and flush with an outer wall of the outer tube 10 and an outer wall formed with a locking seat 22 and an opening 25 located beside the locking seat 22 and aligning with the opening 11 of the outer tube 10. The locking seat 22 of the sleeve 20 has a peripheral wall formed with a through hole 23 aligning with the through hole 13 of the outer tube 10 and has an end portion formed with an upright stop portion 24.

The push member 50 is movably mounted on the locking seat 22 of the sleeve 20 and has a first end formed with a receiving chamber 52 having two opposite sides each formed with an oblique adjusting slot 53 and a second end formed with a serrated push portion 51.

An elastic member 501 is mounted in the locking seat 22 of the sleeve 20 and biased between the stop portion 24 of the sleeve 20 and the first end of the push member 50 to push the push member 50 toward the outer tube 10.

The mounting bracket 70 is mounted on the locking seat 22 of the sleeve 20, and the push member 50 is slidably mounted in the mounting bracket 70. The mounting bracket 70 has an inside formed with a slideway to slidably receive the push member 50 and has a peripheral wall formed with a locking bore 71.

The positioning member 60 is movably mounted in the receiving chamber 52 of the push member 50 and has a first end extended through the through hole 23 of the sleeve 20, the through hole 13 of the outer tube 10 and the through hole 33 of the inner bushing 30 and selectively and detachably locked in either one of the positioning holes 41 of the inner tube 40 to lock the inner tube 40 in the outer tube 10. The positioning member 60 has a second end detachably locked in the locking bore 71 of the mounting bracket 70.

An elastic member 602 is mounted on the second end of the positioning member 60 and biased between the mounting bracket 70 and the positioning member 60 to push the positioning member 60 toward the push member 50.

A control member 601 is mounted on the positioning member 60 to move the positioning member 60 and has two ends each slidably mounted in the respective oblique adjusting slot 53 of the push member 50. The control member 601 is a control rod extended through a mediate portion of the positioning member 60.

The retaining member 80 is pivotally mounted on the locking seat 22 of the sleeve 20 and the mounting bracket 70 and has a first end formed with a serrated press portion 82 rested on a surface of the mounting bracket 70 and pressed on the second end of the positioning member 60 to stop movement the positioning member 60 and a second end formed with a tilt portion 81 extended through the opening 25 of the sleeve 20, the opening 11 of the outer tube 10 and the opening 31 of the inner bushing 30.

Figure 4:
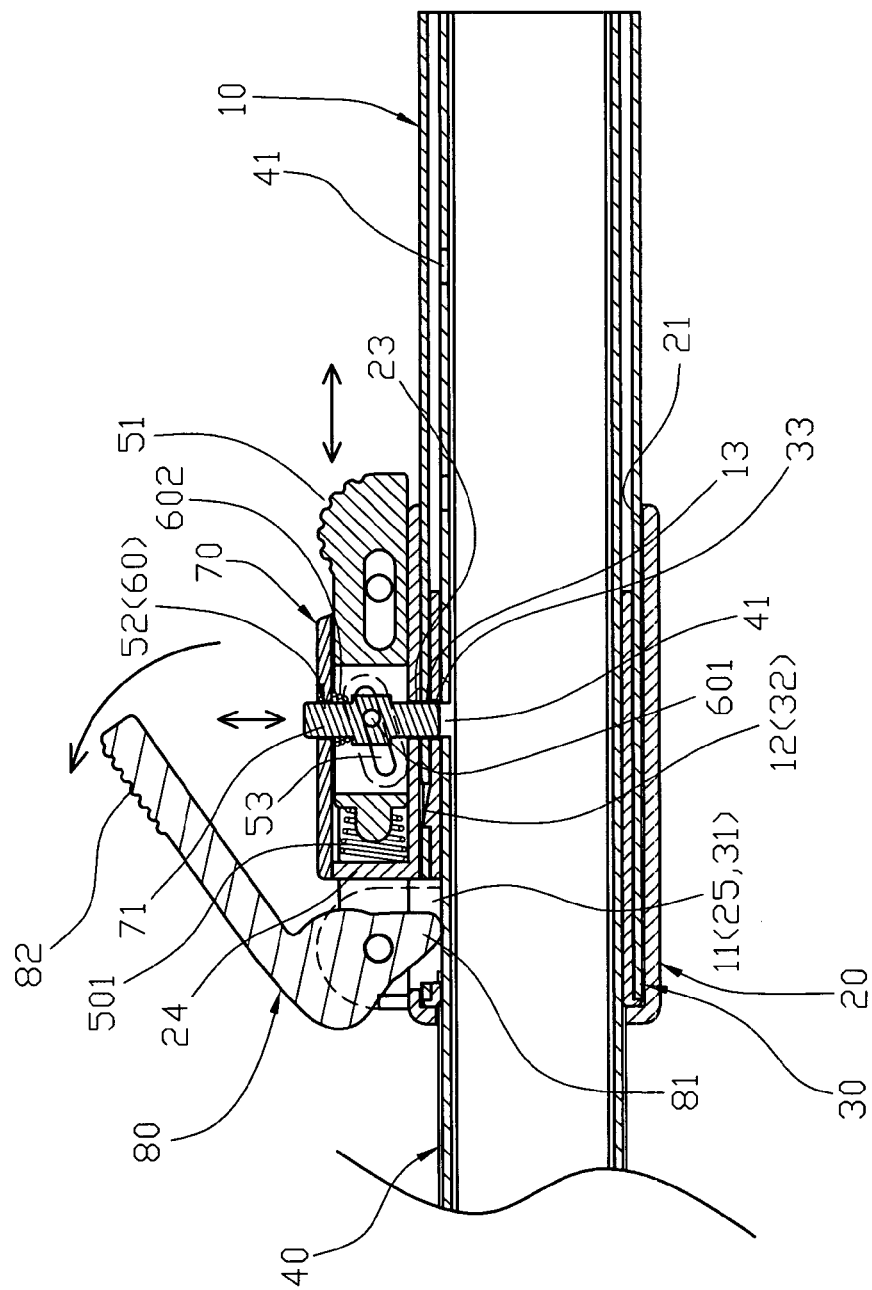
FIG. 4 is a schematic operational view of the telescopically adjustable pipe as shown in FIG. 3.

In operation, referring to FIGS. 3 and 4 with reference to FIGS. 1 and 2, the retaining member 80 is pivoted upward to detach the press portion 82 from the second end of the positioning member 60 so that the positioning member 60 is movable freely. Then, the push member 50 is pushed to move and retract into the locking seat 22 of the sleeve 20. At this time, the control member 601 is movable upward in the oblique adjusting slots 53 of the push member 50 to push the positioning member 60 to move upward, thereby detaching the first end of the positioning member 60 from the respective positioning hole 41 of the inner tube 40 to unlock the inner tube 40 from the outer tube 10, so that the inner tube 40 is movable freely relative to the outer tube 10 so as to adjust the length of the telescopically adjustable pipe.

When the first end of the positioning member 60 is aligned with a predetermined positioning hole 41 of the inner tube 40, the push member 50 and the positioning member 60 are pushed to return to the original position by the restoring force of the elastic member 501 and the elastic member 602 respectively, so that the first end of the positioning member 60 is locked in the predetermined positioning hole 41 of the inner tube 40 to lock the inner tube 40 in the outer tube 10 again.

Finally, the retaining member 80 is pivoted downward to press the press portion 82 on the second end of the positioning member 60 to stop movement the positioning member 60 so that the positioning member 60 is locked.

Accordingly, the positioning member 60 is locked in the respective positioning hole 41 of the inner tube 40 to lock the inner tube 40 in the outer tube 10, so that the inner tube 40 is locked in and cannot slip from the outer tube 10. In addition, the press portion 82 of the retaining member 80 is pressed on the positioning member 60 to stop movement the positioning member 60, thereby locking the positioning member 60, so that the inner tube 40 is locked in the outer tube 10 rigidly and stably. Further, the push member 50 and the positioning member 60 are pushed to return to the original position by the restoring force of the elastic member 501 and the elastic member 602 respectively, so that the positioning member 60 is locked in the respective positioning hole 41 of the inner tube 40 so as to lock the inner tube 40 in the outer tube 10 automatically, thereby facilitating a user adjusting the length of the telescopically adjustable pipe.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A telescopically adjustable pipe, comprising:
   an outer tube;
   an inner tube movably mounted in the outer tube and having an end portion formed with a plurality of positioning holes;
   a sleeve mounted on an end portion of the outer tube and having an outer wall formed with a locking seat;
   a push member movably mounted on the locking seat of the sleeve and having a first end formed with a receiving chamber having two opposite sides each formed with an oblique adjusting slot;
   a positioning member movably mounted in the receiving chamber of the push member and having a first end extended through the sleeve and the outer tube and detachably locked in either one of the positioning holes of the inner tube to lock the inner tube in the outer tube;
   a control member mounted on the positioning member to move the positioning member and having two ends each slidably mounted in the respective oblique adjusting slot of the push member;
   a mounting bracket mounted on the locking seat of the sleeve, wherein the push member is slidably mounted in the mounting bracket;
   wherein the mounting bracket has a peripheral wall formed with a locking bore, and the positioning member has a second end detachably locked in the locking bore of the mounting bracket;
   a retaining member pivotally mounted on the mounting bracket and having a first end formed with a press portion pressed on the second end of the positioning member to stop movement the positioning member.

2. The telescopically adjustable pipe in accordance with claim 1, wherein the locking seat of the sleeve has an end portion formed with an upright stop portion, and the telescopically adjustable pipe further comprises an elastic member mounted in the locking seat of the sleeve and biased between the stop portion of the sleeve and the first end of the push member to push the push member toward the outer tube.

3. The telescopically adjustable pipe in accordance with claim 1, further comprising an inner bushing mounted between the end portion of the outer tube and the end portion of the inner tube.

4. The telescopically adjustable pipe in accordance with claim 3, wherein the end portion of the outer tube is formed with a through hole, the sleeve has a peripheral wall formed with a through hole aligning with the through hole of the outer tube, the inner bushing has a peripheral wall formed with a through hole aligning with the through hole of the outer tube, and the first end of the positioning member is extended through the through hole of the sleeve, the through hole of the outer tube and the through hole of the inner bushing.

5. The telescopically adjustable pipe in accordance with claim 3, wherein the end portion of the outer tube is formed with a locking hole, and the inner bushing has a peripheral wall formed with a wedge-shaped locking block locked in the locking hole of the outer tube.

6. The telescopically adjustable pipe in accordance with claim 1, wherein the sleeve has an inner wall formed with a fitting hole fitted onto and flush with an outer wall of the outer tube.

7. The telescopically adjustable pipe in accordance with claim 1, wherein the control member is a control rod extended through a mediate portion of the positioning member.

8. The telescopically adjustable pipe in accordance with claim 1, wherein the push member has a second end formed with a serrated push portion.

9. The telescopically adjustable pipe in accordance with claim 1, wherein the mounting bracket has an inside formed with a slideway to slidably receive the push member.

10. The telescopically adjustable pipe in accordance with claim 1, further comprising an elastic member mounted on the second end of the positioning member and biased between the mounting bracket and the positioning member to push the positioning member toward the push member.

11. The telescopically adjustable pipe in accordance with claim 1, wherein the press portion of the retaining member is rested on a surface of the mounting bracket.

12. The telescopically adjustable pipe in accordance with claim 1, wherein the end portion of the outer tube is formed with an opening, the outer wall of the sleeve is formed with an opening located beside the locking seat and aligning with the opening of the outer tube, and the retaining member has a second end formed with a tilt portion extended through the opening of the sleeve and the opening of the outer tube.

13. The telescopically adjustable pipe in accordance with claim 12, further comprising an inner bushing mounted between the end portion of the outer tube and the end portion of the inner tube and having a peripheral wall formed with an opening aligning with the opening of the outer tube, wherein the second end of the retaining member is extended through the opening of the inner bushing.

14. The telescopically adjustable pipe in accordance with claim 1, wherein when the push member is pushed to move and retract into the locking seat of the sleeve, the control member is movable upward in the oblique adjusting slots of the push member to push the positioning member to move upward, thereby detaching the first end of the positioning member from the respective positioning hole of the inner tube to unlock the inner tube from the outer tube, so that the inner tube is movable freely relative to the outer tube.

15. A telescopically adjustable pipe, comprising:
   an outer tube;
   an inner tube movably mounted in the outer tube and having an end portion formed with a plurality of positioning holes;
   a sleeve mounted on an end portion of the outer tube and having an outer wall formed with a locking seat;
   a push member movably mounted on the locking seat of the sleeve and having a first end formed with a receiving chamber having two opposite sides each formed with an oblique adjusting slot;
   a positioning member movably mounted in the receiving chamber of the push member and having a first end extended through the sleeve and the outer tube and detachably locked in either one of the positioning holes of the inner tube to lock the inner tube in the outer tube;
   a control member mounted on the positioning member to move the positioning member and having two ends each slidably mounted in the respective oblique adjusting slot of the push member;
   a retaining member pivotally mounted on the locking seat of the sleeve and having a press portion pressed on a second end of the positioning member to stop movement the positioning member.

16. The telescopically adjustable pipe in accordance with claim 15, wherein when the retaining member is pivoted upward, the press portion of the retaining member is detached from the second end of the positioning member so that the positioning member is movable freely.

17. The telescopically adjustable pipe in accordance with claim 15, wherein when the retaining member is pivoted downward, the press portion of the retaining member is pressed on the second end of the positioning member to stop movement the positioning member so that the positioning member is locked.

* * * * *